US010256463B2

(12) United States Patent
Meng et al.

(10) Patent No.: US 10,256,463 B2
(45) Date of Patent: Apr. 9, 2019

(54) COMPOSITE ANODE ACTIVE MATERIAL, ANODE AND LITHIUM BATTERY CONTAINING THE MATERIAL, AND METHOD OF PREPARING THE COMPOSITE ANODE ACTIVE MATERIAL

(71) Applicant: Samsung SDI Co., Ltd., Yongin-si, Gyeonggi-do (KR)

(72) Inventors: Xianhui Meng, Yongin-si (KR); Sanghyuck Ahn, Yongin-si (KR); Sukyung Lee, Yongin-si (KR); Yeongap Kim, Yongin-si (KR); Youngjin Choi, Yongin-si (KR); Deokhyun Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 465 days.

(21) Appl. No.: 14/836,840

(22) Filed: Aug. 26, 2015

(65) Prior Publication Data

US 2016/0079593 A1 Mar. 17, 2016

(30) Foreign Application Priority Data

Sep. 16, 2014 (KR) ........................ 10-2014-0122920

(51) Int. Cl.
*H01M 4/38* (2006.01)
*H01M 4/36* (2006.01)
(Continued)

(52) U.S. Cl.
CPC ........... *H01M 4/386* (2013.01); *H01M 4/364* (2013.01); *H01M 4/366* (2013.01); *H01M 4/58* (2013.01);
(Continued)

(58) Field of Classification Search
CPC ............................. H01M 4/134; H01M 4/386
See application file for complete search history.

(56) References Cited

U.S. PATENT DOCUMENTS

2004/0214085 A1* 10/2004 Sheem ................. H01M 4/134
429/218.1
2007/0128517 A1 6/2007 Christensen et al.
(Continued)

FOREIGN PATENT DOCUMENTS

KR 10-2008-0072025 A 8/2008
KR 10-2008-0081283 A 9/2008
KR 10-2013-0067298 A 6/2013

OTHER PUBLICATIONS

"Si Alloy Anode: Sudden Fade Challenge, Project # ES256, Electronics Materials Solutions Division, Jun. 10, 2015," 3M, online: < URL: https://www.energy.gov/sites/prod/files/2015/06/f23/es256_singh_2015_p.pdf> [retrieved on May 14, 2018].*
(Continued)

*Primary Examiner* — Jonathan Crepeau
(74) *Attorney, Agent, or Firm* — Knobbe, Martens, Olson & Bear, LLP

(57) ABSTRACT

Provided is a composite anode active material with pores having a composition represented by Formula 1, and, the composite anode active material contains an amorphous phase including Si and a nano-crystalline phase including a metal silicide:

$$Si_xM_yC_z \qquad \text{<Formula 1>}$$

wherein, in Formula 1,
x, y, and z each represent an atomic percentage;
$x+y+z=100$;
$x>y+z$;
$x>0$, $y>0$, and $z\geq0$; and
(Continued)

M is at least one metal selected from Mn, Mo, Nb, W, Ta, Fe, Cu, Ni, Co, Zr, Y, and a combination thereof.

17 Claims, 5 Drawing Sheets

(51) Int. Cl.
*H01M 4/583* (2010.01)
*H01M 10/052* (2010.01)
*H01M 4/58* (2010.01)
*H01M 4/62* (2006.01)

(52) U.S. Cl.
CPC ........... *H01M 4/583* (2013.01); *H01M 4/628* (2013.01); *H01M 10/052* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2007/0148544 A1 | 6/2007 | Le |
| 2013/0034714 A1* | 2/2013 | Canham ................ A61K 8/25 |
| | | 428/219 |
| 2013/0216907 A1 | 8/2013 | Rayner et al. |
| 2017/0194642 A1* | 7/2017 | Moc ...................... H01M 4/386 |

OTHER PUBLICATIONS

Kasavajjula et al., "Nano- and bulk-silicon-based insertion anodes for lithium-ion secondary cells," *Journal of Power Sources* 163 (2007) pp. 1003-1039.

Liu et al., "A Yolk-Shell Design for Stabilized and Scalable Li-Ion Battery Alloy Anodes," © 2012 American Chemical Society, *Nano Letters* 12, pp. 3315-3321.

* cited by examiner

COMPOSITE ANODE ACTIVE MATERIAL, ANODE AND LITHIUM BATTERY CONTAINING THE MATERIAL, AND METHOD OF PREPARING THE COMPOSITE ANODE ACTIVE MATERIAL

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2014-0122920, filed on Sep. 16, 2014, in the Korean Intellectual Property Office, the disclosure of which is incorporated herein in its entirety by reference.

BACKGROUND

Field

This disclosure relates to a composite anode active material, an anode and a lithium battery each including the composite anode active material, and a method of preparing the composite anode active material.

Description of the Related Technology

Lithium batteries have high voltage and high energy density, and thus are used in various applications. Devices such as electric vehicles (e.g., HEVs or PHEVs) should be operable at high temperatures, be able to charge or discharge a large amount of electricity, and be used on a long term basis, and thus require lithium batteries having high-discharge capacity and enhanced lifespan characteristics.

Carbonaceous materials are porous and stable with little volumetric change during charging and discharging. Meanwhile, carbonaceous materials may lead to a low-battery capacity due to the porous structure of carbon. For example, graphite, which is an ultra-high crystalline material, has a theoretical capacity density of about 372 mAh/g in the composition of $LiC_6$. Also, carbonaceous materials have poor high-rate characteristics.

A metal alloyable with lithium may be used as an anode active material having a high electric capacity compared to the carbonaceous material. Examples of the metal alloyable with lithium include silicon (Si), tin (Sn), and aluminum (Al). However, although the metal alloyable with lithium has a high-discharge capacity, volumetric change of the metal is large during charging and discharging, and thus the metal alloyable with lithium may easily deteriorate. Accordingly, a battery including the metal alloyable with lithium may have relatively poor life-time characteristics.

In order to reduce volumetric change of the metal alloyable with lithium, a composite may be formed by dispersing a metal alloyable with lithium in a matrix of a metal oxide or an alloy having electrochemically low reactivity or inertness. However, even when the metal alloy with lithium is dispersed in the matrix, volumetric change of the composite due to the volumetric change of the metal alloyable with lithium is not preventable, and thus resulting in deterioration of the composite and a decrease in lifespan characteristics of the battery may occur.

Therefore, lithium batteries with improved discharge capacity and lifespan characteristics are still needed.

SUMMARY

Some embodiments provide a composite anode active material having a novel structure.

Some embodiments provide an anode including the composite anode active material.

Some embodiments provide a lithium battery including the anode.

Some embodiments provide a method of preparing the composite anode active material.

Additional embodiments will be set forth in part in the description which follows and, in part, will be apparent from the description, or may be learned by practice of the presented embodiments.

According to one or more exemplary embodiments, a composite anode active material includes a composition represented by Formula 1; and a multi-phase microstructure containing an amorphous phase including Si and a nano-crystalline phase including a metal silicide; wherein the composite anode active material is porous:

$$Si_xM_yC_z \qquad \text{<Formula 1>}$$

wherein, in Formula 1, x, y, and z each represent an atomic percentage;

x+y+z=100;

x>y+z;

x>0, y>0, and z≥0; and

M is at least one metal selected from Mn, Mo, Nb, W, Ta, Fe, Cu, Ni, Co, Zr, Y, and a combination thereof.

According to one or more exemplary embodiments, an anode includes the composite anode active material.

According to one or more exemplary embodiments, a lithium battery includes the anode.

According to one or more exemplary embodiments, a method of preparing a composite anode active material includes preparing a precursor composition including Si, M, and optionally C, wherein the precursor composition has a multi-phase microstructure containing an amorphous phase including Si, a nano-crystalline phase including a metal silicide, and another nano-crystalline phase form of a metal; and preparing a porous composition represented by Formula 1 below by contacting the precursor composition with a strong acid:

$$Si_xM_yC_z \qquad \text{<Formula 1>}$$

x, y, and z each represent an atomic percentage;

x+y+z=100;

x>y+z;

x>0, y>0, and z≥0; and

M is at least one metal selected from Mn, Mo, Nb, W, Ta, Fe, Cu, Ni, Co, Zr, Y, and a combination thereof.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
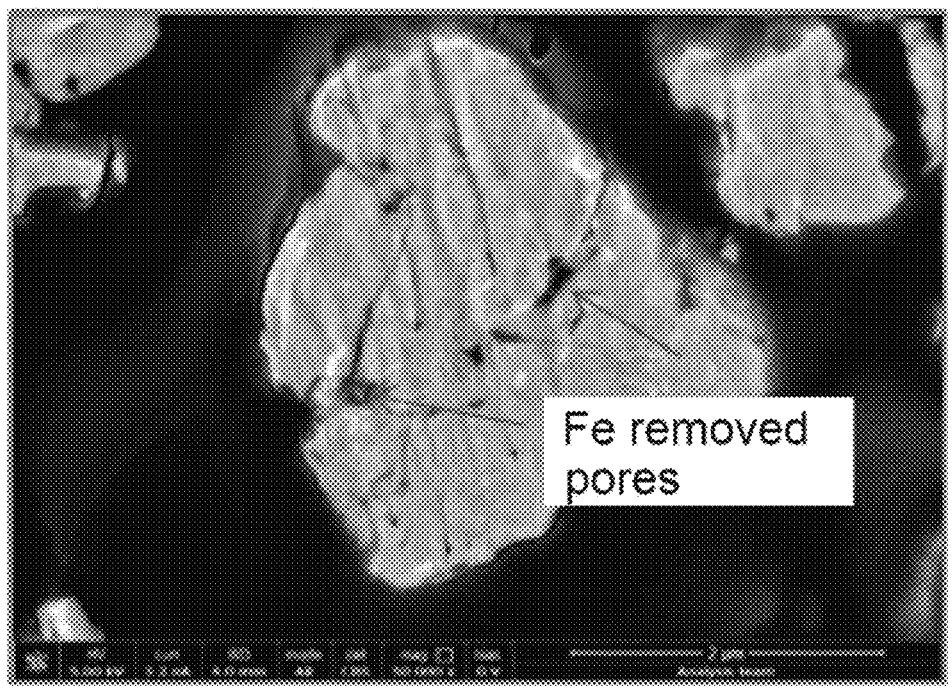
FIG. 1 is a scanning electron microscopic (SEM) image of a composite anode active material with pores prepared in Example 1.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Additional aspects will be set forth in part in the description which follows and, in part, will be apparent from the description, or may be learned by practice of the presented embodiments.

Hereinafter, one or more exemplary embodiments of a composite anode active material, an anode and a lithium battery each including the composite anode active material, and a method of preparing the composite anode active material will be described in greater detail.

A composite anode active material according to an exemplary embodiment has a composition represented by Formula 1 and has a multi-phase microstructure containing an amorphous phase including Si and a nano-crystalline phase including a metal silicide. Also, the composite anode active material is porous.

$$Si_xM_yC_z \qquad \text{<Formula 1>}$$

In Formula 1, x, y, and z each represent an atomic percentage; $x+y+z=100$; $x>y+z$; $x>0$, $y>0$, and $z\geq0$; and M is at least one metal selected from Mn, Mo, Nb, W, Ta, Fe, Cu, Ni, Co, Zr, Y, and a combination thereof.

The composite anode active material includes the multi-phase microstructure, in which the amorphous phase including Si that is electrochemically active is dispersed in the nano-crystalline phase including a metal silicide that is electrochemically inactive, and thus, during charging and discharging, the composite anode active material may accommodate the volumetric change of the amorphous phase. In addition, since the composite anode active material is porous, the volumetric change of the amorphous phase is more effectively accommodated, and thus degradation of the multi-phase microstructure can be prevented. Therefore, lifespan of a lithium battery including the composite anode active material may be improved.

The multi-phase microstructure of the composite anode active material may further include the nano-crystalline phase formed of a metal. The metal corresponds to M in Formula 1. The nano-crystalline phase formed of the metal may be the residual metal (M) that remains unreacted without forming a metal silicide by reacting with Si in a process of preparing the composite anode active material.

Since the composite anode material is porous, the composite anode active material may have a plurality of pores, and the pores may be distributed uniformly or non-uniformly within the multi-phase microstructure.

In some embodiments, M in the composite anode active material may be at least one metal selected from copper (Co), nickel (Ni), iron (Fe), titanium (Ti), molybdenum (Mo), tungsten (W) and a combination thereof. In some embodiments, M in the composite anode active material may be Fe.

The metal silicide in the composite anode active material may be at least one selected from the group consisting of $Fe_2Si$, $Fe_5Si_3$, $FeSi$, and $FeSi_2$. In some embodiments, the metal silicide in the composite anode active material may be $FeSi_2$.

In Formula 1 of the composite anode active material, $x\geq60$. In some embodiments, an amount of Si in the composite anode active material may be 60 atomic % or more. In some embodiments, an amount of Si in the composite anode active material may be in a range of about 60 atomic % to about 90 atomic %. In some embodiments, an amount of Si in the composite anode active material may be in a range of about 65 atomic % to about 85 atomic %. In some embodiments, an amount of Si in the composite anode active material may be in a range of about 65 atomic % to about 80 atomic %. In some embodiments, an amount of Si in the composite anode active material may be in a range of about 65 atomic % to about 75 atomic %. In Formula 1 of the composite anode active material, $y\geq1$. In some embodiments, an amount of M in the composite anode active material may be 1 atomic % or more. In some embodiments, an amount of M in the composite anode active material may be in a range of about 5 atomic % to about 35 atomic %. In some embodiments, an amount of M in the composite anode active material may be in a range of about 5 atomic % to about 30 atomic %. In some embodiments, an amount of M in the composite anode active material may be in a range of about 10 atomic % to about 30 atomic %. In some embodiments, an amount of M in the composite anode active material may be in a range of about 15 atomic % to about 25 atomic %.

In Formula 1 of the composite anode active material, $z>0$. In some embodiments, an amount of C in the composite anode active material may be in a range of about 1 atomic % to about 20 atomic %. In some embodiments, an amount of C in the composite anode active material may be in a range of about 3 atomic % to about 15 atomic %. In some embodiments, an amount of C in the composite anode active material may be in a range of about 5 atomic % to about 15 atomic %. In the composite anode active material, when $z>0$, the multi-phase microstructure of the composite anode active material may further include a phase including a silicon carbide.

In Formula 1 of the composite anode active material, x, y, and z may satisfy $60\leq x\leq90$, $5\leq y\leq35$, and $5\leq z\leq20$. In some embodiments, the composite anode active material may have a composition represented by Formula 2.

$$Si_xM_yC_z \qquad \text{<Formula 2>}$$

In Formula 2, x, y, and z each represent an atomic percentage; $x+y+z=100$; $60\leq x\leq90$, $5\leq y\leq35$, and $5\leq z\leq20$; and M is at least one metal selected from Mn, Mo, Nb, W, Ta, Fe, Cu, Ni, Co, Zr, Y, and a combination thereof.

In an X-ray diffraction (XRD) spectrum of the composite anode active material with respect to a CuK-α characteristic X-ray wavelength at 1.541 Å, a ratio (A1/A2) of an area (A1) of a first peak of the composite anode active material that appears at a Bragg angle 2θ of about 45.0±1.0° to an area (A2) of a second peak of the composite anode active material that appears at a Bragg angle 2θ of about 49.0±3.0° may be 0.05 or less. For example, a ratio (A1/A2) of an area (A1) of the first peak to an area (A2) of the second peak may be 0.04 or less. For example, a ratio (A1/A2) of an area (A1) of the first peak and an area (A2) of the second peak may be 0.035 or less. When a ratio (A1/A2) of an area (A1) of the first peak to an area (A2) of the second peak is greater than 0.05, an amount of the nano-crystalline phase formed of a metal in the composite anode active material increases, and thus side reactions with an electrolyte solution may promote deterioration of the composite anode active material. Therefore, lifespan characteristics of the lithium battery may be degraded.

In the XRD spectrum of the composite anode active material with respect to a CuK-α characteristic X-ray wavelength at 1.541 Å, the first peak that appears at a Bragg angle 2θ of about 45.0±1.0° may be derived from the nano-crystalline phase formed of a metal, and the second peak that appears at a Bragg angle 2θ of about 49.0±3.0° may be derived from the nano-crystalline phase including a metal silicide. In some embodiments, in the XRD spectrum of the composite anode active material, the first peak may correspond to Fe, and the second peak may correspond to $FeSi_2$.

A pore diameter of the composite anode active material with pores may be 500 nm or less. In some embodiments, the pore diameter of the composite anode active material may be in a range of about 1 nm to about 500 nm. In some embodiments, the pore diameter of the composite anode active material may be in a range of about 1 nm to about 400 nm. In some embodiments, the pore diameter of the composite anode active material may be in a range of about 1 nm to about 300 nm. In some embodiments, the pore diameter of the composite anode active material may be in a range of about 1 nm to about 200 nm. In some embodiments, the pore diameter of the composite anode active material may be in a range of about 1 nm to about 100 nm. In some embodiments, the pore diameter of the composite anode active material may be in a range of about 10 nm to about 100 nm. In some embodiments, the pore diameter of the composite anode active material may be in a range of about 20 nm to about 100 nm. When pores have an aspherical shape, a pore diameter is an average value of a distance of the longest line and a distance of the shortest line among straight lines passing through each of the pores.

The pores of the composite anode active material with pores may be formed by etching away a portion of or the whole nano-crystalline phase formed of a metal. That is, the pores may be formed by etching away a portion of or the whole metal (M) which is at least one selected from Co, Ni, Fe, Ti, Mo, W, and a combination thereof, in the multi-phase microstructure represented by Formula 1.

The composite anode active material may further include a coating layer that is formed on a composition core having a composition represented by Formula 1. In some embodiments, the composite anode active material may have a structure including the core that contains the composition represented by Formula 1 and the coating layer that is formed on at least a portion of the core. A portion of or the whole surface of the core may be coated with the coating layer.

The coating layer in the composite anode active material may include carbon. In some embodiments, the carbon in the coating layer may include amorphous carbon. In some embodiments, the carbon in the coating layer may be a calcined product of a carbon precursor. Any material available in the art may be used as a carbon precursor as long as a carbonaceous material may be obtained by calcining the material. For example, the carbon precursor may be at least one selected from the group consisting of a polymer, coal tar pitch, petroleum pitch, meso-phase pitch, coke, low molecular weight heavy oil, a coal-based pitch, and derivatives thereof. When a carbonaceous coating layer is formed on the core, it forms a kind of a solid electrolyte interface (SEI), and thus, due to selective penetration of Li+ ions through the SEI, contact between a Si amorphous phase and the electrolytic solution may be prevented.

An amount of the coating layer on the composite anode active material is not particularly limited, and, for example, the amount of the coating layer may be in a range of more than about 0 wt % to about 10 wt % based on the total weight of the composite anode active material including the coating layer. In some embodiments, the amount of the coating layer in the composite anode active material may be in a range of about 1 wt % to about 8 wt % based on the total weight of the composite anode active material including the coating layer. In some embodiments, the amount of the coating layer in the composite anode active material may be in a range of about 1 wt % to about 6 wt % based on the total weight of the composite anode active material including the coating layer. In some embodiments, the amount of the coating layer in the composite anode active material may be in a range of about 1 wt % to about 4 wt % based on the total weight of the composite anode active material including the coating layer.

According to another embodiment, an anode includes the above-described composite anode active material. For example, the anode may be manufactured by molding an anode active material composition including the composite anode active material and a binder into a desired shape, by coating the anode active material composition on a current collector such as a copper foil.

Specifically, the composite anode active material, a conducting agent, a binder, and a solvent are mixed to prepare the anode active material composition. The anode active material composition may be directly coated on a metallic current collector to prepare an anode plate. Alternatively, the anode active material composition may be cast on a separate support to form an anode active material film, which may then be separated from the support and laminated on a metallic current collector to prepare an anode plate. The anode is not limited to the examples described above, and may be one of a variety of types.

The conducting agent may include carbon black such as acetylene black, ketjen black; graphite, such as natural graphite, artificial graphite; carbon fiber or metallic fiber, such as copper fiber, nickel fiber, aluminum fiber or silver fiber; carbon powder or metallic powder such as copper powder, nickel powder, aluminum powder or silver powder; polyphenylene derivatives, or a mixture thereof, but not limited thereto. Any one of various conducting agent available in the art may be used as the conducting agent. The above-described crystalline carbonaceous materials may be added as the conducting agent.

Examples of the binder may be, but not limited to, a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Any binder available in the art may be used as the binder.

Examples of the solvent may be, but not limited to, N-methyl-pyrrolidone, acetone, and water. Any material available as a solvent in the art may be used as the solvent.

The amounts of the composite anode active material, the conducting agent, the binder, and the solvent used herein may be used at levels suitable for lithium battery. One or more of the conducting agent, the binder, and the solvent may be omitted according to a purpose and structure of the lithium battery.

A lithium battery according to an embodiment includes the anode including the composite anode active material. The lithium battery may be manufactured as follows.

First, an anode is prepared according to the method described above.

Then, a cathode active material, a conducting agent, a binder, and a solvent are mixed to prepare a cathode active material composition. The cathode active material composition may be directly coated on a metallic current collector and dried to prepare a cathode plate. Alternatively, the cathode active material composition may be cast onto a separate support and separated from the support as a film, and then the film may be laminated on a metallic current collector to prepare a cathode plate.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. The cathode active material is not limited to these examples, and may be any cathode active material available in the art.

In some embodiments, the cathode active material may be a compound selected from $Li_aA_{1-b}B^1_bD^1_2$ (where, $0.90 \le a \le 1.8$, and $0 \le b \le 0.5$); $Li_aE_{1-b}B^1_bO_2{-c}D^1_c$ (where, $0.90 \le a \le 1.8$, $0 \le b \le 0.5$, and $0.5 \le c \le 0.05$); $LiE_{2-b}B^1_bO_{4-c}D^1_c$ (where, $0 \le b \le 0.5$, and $0 \le c \le 0.05$); $Li_aNi_{1-b-c}Co_bB^1_cD^1_\alpha$ (where, $0.90 \le a \le 1.8$, $0 \le b \le 0.5$, $0 \le c \le 0.05$, and $0 < \alpha \le 2$); $Li_aNi_{1-b-c}Co_bB^1_cO_{2-\alpha}F^1_\alpha$ (where, $0.90 \le a \le 1.8$, $0 \le b \le 0.5$, $0 \le c \le 0.05$, and $0 < \alpha < 2$); $Li_aNi_{1-b-c}Co_bB^1_cO_{2-\alpha}F^1_2$ (where, $0.90 \le a \le 1.8$, $0 \le b \le 0.5$, $0 \le c \le 0.05$, and $0 < \alpha < 2$); $Li_aNi_{1-b-c}Mn_bB^1_cD^1_\alpha$ (where, $0.90 \le a \le 1.8$, $0 \le b \le 0.5$, $0 \le c \le 0.05$, and $0 < \alpha \le 2$); $Li_aNi_{1-b-c}Mn_bB^1_cO_{2-\alpha}D^1_\alpha$ (where, $0.90 \le a \le 1.8$, $0 \le b \le 0.5$, $0 \le c \le 0.05$, and $0 < \alpha < 2$); $Li_aNi_{1-b-c}Mn_bB^1_cO_{2-\alpha}F^1_2$ (where, $0.90 \le a \le 1.8$, $0 \le b \le 0.5$, $0 \le c \le 0.05$, and $0 < \alpha < 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dGeO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$, and $0.001 \le b \le 0.1$); $Li_aCoG_bO_2$ (where, $0.90 \le a \le 1.8$, and $0.001 \le b \le 0.1$); $Li_aMnG_bO_2$ (where, $0.90 \le a \le 1.8$, and $0.001 \le b \le 0.1$); $Li_aMn_2G_bO_4$ (where, $0.90 \le a \le 1.8$, and $0.001 \le b \le 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In the formulae above, A is nickel (Ni), cobalt (Co), manganese (Mn), or a combination thereof; $B^1$ is aluminum (Al), nickel (Ni), cobalt (Co), manganese (Mn), chromium (Cr), iron (Fe), magnesium (Mg), strontium (Sr), vanadium (V), a rare earth element, or a combination thereof; $D^1$ is oxygen (O), fluorine (F), sulfur (S), phosphorus (P), or a combination thereof; E is cobalt (Co), manganese (Mn), or a combination thereof; $F^1$ is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; $I^1$ is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above as cathode active materials may have a surface coating layer (hereinafter, "coating layer"). Alternatively, a mixture of a compound without a coating layer and a compound having a coating layer may be used. The cathode active material may be a combination of compounds selected from the compounds listed above. The coating layer may include at least one coating element compound selected from an oxide, hydroxide, oxyhydroxide, oxycarbonate, and hydroxycarbonate of the coating element. The compounds of the coating layer may be amorphous or crystalline. The coating layer may comprise magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material. For example, the coating layer may be formed by using a spray coating method, a dipping method, or the like. The coating method may be determined by one of ordinary skill in the art without undue experimentation, and thus a detailed description thereof will be omitted.

Examples of the cathode active material may include $LiNiO_2$, $LiCoO_2$, $LiMn_xO_{2x}$ (where, x=1, 2), $LiNi_{1-x}Mn_xO_2$ (where, $0 < x < 1$), $LiNi_{1-x-y}Co_xMn_yO_2$ (where, $0 \le x \le 0.5$, and $0 \le y \le 0.5$), $LiFeO_2$, $V_2O_5$, TiS, and MoS.

The conducting agent, the binder, and the solvent used for a cathode active material composition may be the same as those used for the anode active material composition. Each of the cathode active material composition and the anode active material composition may further include a plasticizer to form pores in the cathode or anode plate.

Amounts of the cathode active material, the conducting agent, the binder, and the solvent used herein may be used at levels suitable for a lithium battery. One or more of the conducting agent, the binder, and the solvent may be omitted according to the purpose and the structure of the lithium battery.

Next, a separator to be interposed between the cathode and the anode is prepared. The separator may be any one of various separators that is typically used for lithium batteries. The separator may have low resistance to ion flow and a high electrolytic solution-retaining capability. Examples of the separator are glass fiber, polyester, Teflon, polyethylene, polypropylene, polytetrafluoroethylene (PTFE), and a combination thereof, each of which may be a non-woven or woven fabric from. For example, a rollable separator including polyethylene or polypropylene may be used for a lithium ion battery. A separator with a good organic electrolytic solution-retaining capability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast onto a support, dried, and then separated from the support as a separator film. Then, the separator film may be laminated onto an electrode to form the separator.

The polymer resin used to manufacture the separator may be any one of various materials that are commonly used as a binder for electrode plates. Examples of the polymer resin include a vinylidenefluoride/hexafluoropropylene copolymer, polyvinylidene fluoride (PVDF), polyacrylonitrile, polymethylmethacrylate, and a mixture thereof.

Next, an electrolyte is prepared.

For example, the electrolyte may be an organic electrolytic solution. Alternately, the electrolyte may be in a solid phase. Non-limiting examples of the electrolyte are lithium oxide and lithium oxynitride. Any solid electrolyte material available in the art may be used as the solid electrolyte. The solid electrolyte may be formed on the anode by, for example, sputtering.

In some embodiments, an organic electrolytic solution may be prepared as follows. The organic electrolytic solution may be prepared by dissolving a lithium salt in an organic solvent.

The organic solvent may be any solvent available as an organic solvent in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently a natural number), LiCl, LiI, and mixtures thereof.

Figure 5:
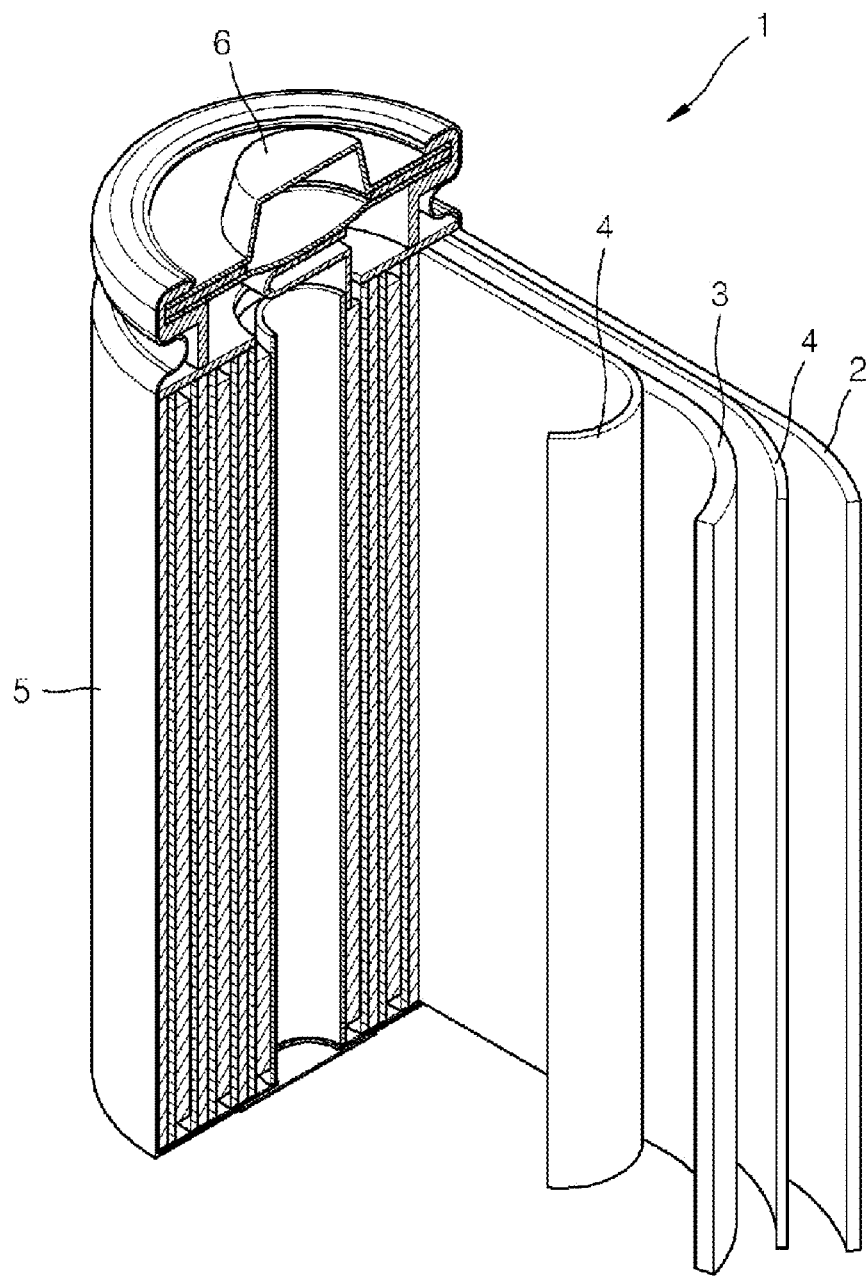
FIG. 5 is a schematic view of a lithium battery according to an exemplary embodiment.

Referring to FIG. 5, a lithium battery 1 includes a cathode 3, an anode 2, and a separator 4. The cathode 3, the anode 2, and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery assembly. Alternatively, the battery assembly may be stacked in a bi-cell structure and impregnated with the organic electrolytic solution. The resultant is put into a pouch and hermetically sealed, thereby completing the manufacture of a lithium ion polymer battery.

Alternatively, a plurality of battery assemblies may be stacked to form a battery pack, which may be used in any device that requires high capacity and high output, for example, in a laptop computer, a smart phone, or an electric vehicle.

The lithium battery may have improved high-rate characteristics and lifespan characteristics, and thus may be applicable in an electric vehicle (EV), for example, in a hybrid vehicle such as a plug-in hybrid electric vehicle (PHEV).

According to an embodiment, a method of preparing a composite anode active material includes preparing a precursor composition including Si, M, and optionally C, wherein the precursor composition has a multi-phase microstructure including an amorphous phase including Si, a nano-crystalline phase including a metal silicide, and another nano-crystalline phase formed of a metal; and preparing a porous composition represented by Formula 1 by contacting the precursor composition with a strong acid:

$Si_xM_yC_z$ <Formula 1>

In Formula 1, x, y, and z each represent an atomic percentage; x+y+z=100; x>y+z, and x>0, y>0, and z≥0; and M is at least one metal selected from Mn, Mo, Nb, W, Ta, Fe, Cu, Ni, Co, Zr, Y, and a combination thereof.

The method of preparing a precursor composition including Si, M, and optionally C, wherein the precursor composition has a multi-phase microstructure including an amorphous phase including Si, a nano-crystalline phase including a metal silicide, and another nano-crystalline phase formed of a metal, is not particularly limited. Any method available as a method of preparing the precursor composition in the art may be used as long as the precursor composition having a multi-phase microstructure including an amorphous phase including Si, a nano-crystalline phase including a metal silicide, and another nano-crystalline phase formed of a metal may be obtained. For example, the precursor composition may be prepared by mixing and mechanically milling a precursor including Si, a precursor including M, and a precursor including C.

The strong acid to be in contact with the precursor composition is not particularly limited, and any material as a strong acid in the art may be used as long as the acid may form pores by etching away a portion of or the whole nano-crystalline phase formed of a metal. For example, in the method, the strong acid may be at least one selected from the group consisting of sulfuric acid, nitric acid, hydrochloric acid, phosphoric acid, acetic acid, and hydrofluoric acid.

The strong acid may be in contact with the precursor composition for about 1 hour to about 24 hours. When the strong acid is in contact with the precursor composition for less than 1 hour, the nano-crystalline phase formed of a metal may be etched away insufficiently, and thus pores may not be formed. When the strong acid is in contact with the precursor composition for more than 24 hours, additional etching may not occur even when a period of time for the contact increases, and thus inefficient.

Certain embodiments of this disclosure will be described in further detail with reference to the following examples. These examples are for illustrative purposes only and are not intended to limit the scope of the disclosure.

Preparation of Composite Anode Active Material

Example 1

2 g of an anode active material (CV6, available from 3M, Minneapolis, Minn., USA,) having a composition of $Si_{70}Fe_{19}C_{11}$ and 3 wt % carbon coated on a surface thereof was added to 40 ml of concentrated sulfuric acid (having a concentration of 37%), and the solution was stirred for 3 hours. Subsequently, the solution was washed several times with water until a pH of the solution was in a range of about 5 to about 6, and then the solution was dried, thereby preparing a porous composite anode active material.

FIG. 1 is an SEM image of a surface of the porous composite anode active material. As shown in FIG. 1, a plurality of pores were formed within the composite anode active material.

Example 2

A composite anode active material with pores was prepared in the same manner as in Example 1, except that the solution was stirred for 4 hours instead of 3 hours.

Example 3

A composite anode active material with pores was prepared in the same manner as in Example 1, except that the solution was stirred for 24 hours instead of 3 hours.

Comparative Example 1

The anode active material (CV6, available from 3M, USA) having a composition of $Si_{70}Fe_{19}C_{11}$ and 3 wt % carbon coated on a surface thereof was used as is.

Preparation of Anode and Lithium Battery

Example 4

The composite anode active material powder synthesized in Example 1 and polyvinylidene fluoride (PVdF), as a binder, were mixed in an N-methylpyrrolidone solvent to prepare a slurry including the composite anode active material and the binder at a weight ratio of about 94:6.

A 10 μm-thick copper (Cu) foil was coated with the slurry to have a thickness of about 90 μm, dried at about 135° C. for about 3 hours, and then roll-pressed to have a thickness of about 70 μm to prepare an anode plate, which was then used to manufacture a coin cell (CR2016 type) having a diameter of about 32 mm.

In the manufacturing process of the coin cell, metallic lithium was used as a counter electrode, a polyethylene separator (Star® 20) having a thickness of about 20 μm was used as a separator, and a solution in which 1.15 M $LiPF_6$ was dissolved in a mixed solvent including ethylenecarbonate (EC), ethylmethylcarbonate (EMC), and diethylcarbonate (DEC) in a volumetric ratio of 3:3:4 was used as an electrolytic solution.

Examples 5 and 6

Lithium batteries were manufactured in the same manner as in Example 4, except that the composite anode active material powders prepared in Examples 2 and 3 were used, respectively.

Comparative Example 2

A lithium battery was manufactured in the same manner as in Example 4, except that the anode active material powder prepared in Comparative Example 1 was used.

Evaluation Example 1: X-Ray Diffraction (XRD) Analysis

XRD analysis was performed on the composite anode active material powders prepared in Examples 1 to 3, and Comparative Example 1. The XRD analysis was performed at a CuK-α characteristic X-ray wavelength of 1.541 Å.

Based on the XRD analysis result, it was confirmed that the composite anode active material prepared in Comparative Example 1 included an amorphous Si phase, a nano-crystalline $FeSi_2$ phase, an amorphous SiC phase, and a nano-crystalline Fe phase.

Figure 2:
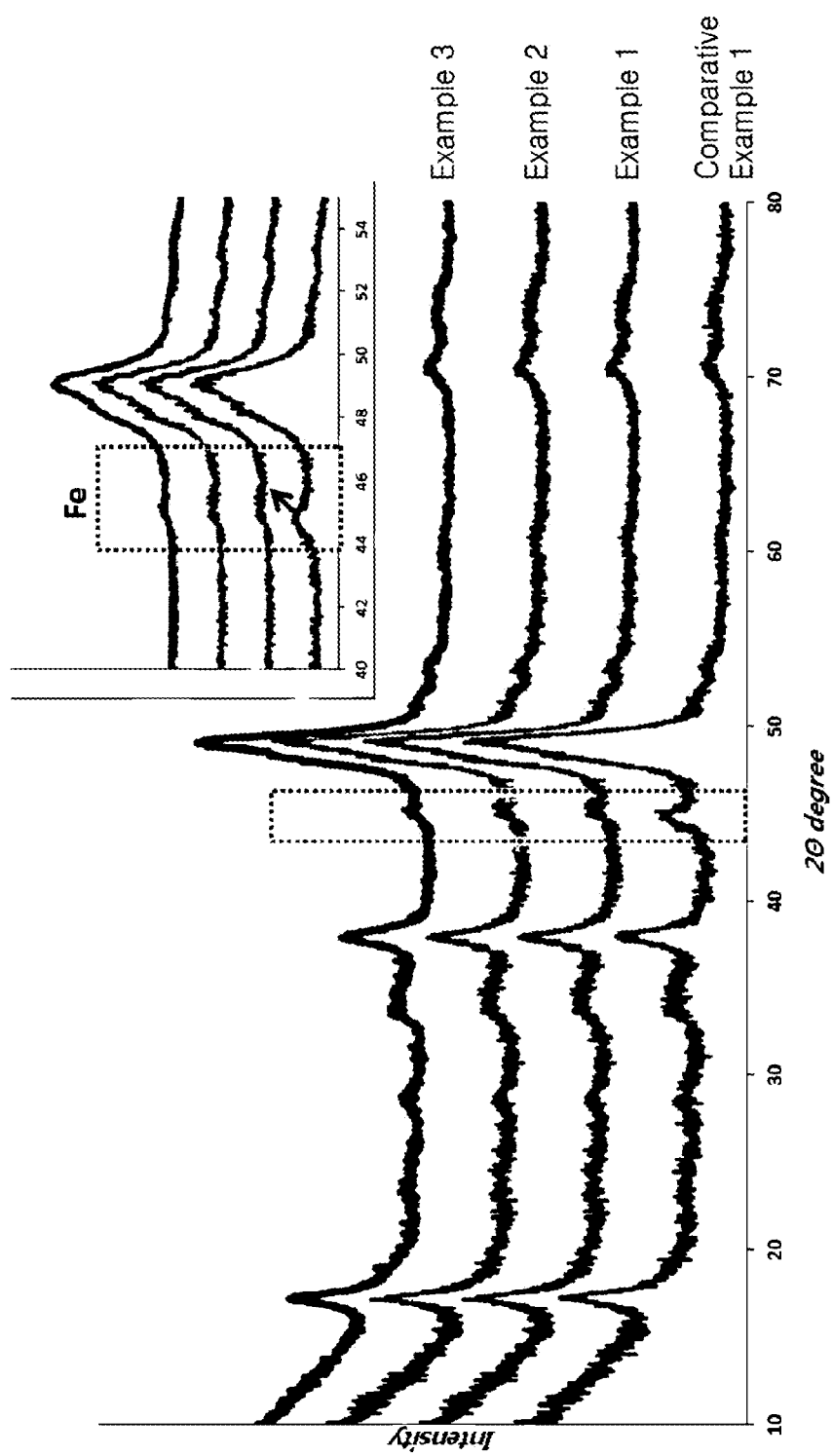
FIG. 2 is an X-ray diffraction (XRD) spectrum of composite anode active materials prepared in Examples 1 to 3 and Comparative Example 1.

As shown in FIG. 2, in the XRD spectrum, particles of the composite anode active materials prepared in Examples 1 to 3 and Comparative Example 1 exhibited a first peak at a Bragg angle 2θ of about 45.0±1.0°, corresponding to Fe, and a second peak at a Bragg angle 2θ of about 49.0±3.0°, corresponding to $FeSi_2$.

As shown in FIG. 2, regarding the composite anode active materials prepared in Examples 1 to 3, it was confirmed that the crystalline phase formed of Fe was reduced by etching since an intensity of the first peak corresponding to Fe gradually decreased. Also, regarding each of the composite anode active materials prepared in Examples 1 to 3 and Comparative Example 1, a ratio (A1/A2) of an area (A1) of the first peak to an area (A2) of the second peak in the XRD spectrum is shown in Table 1.

TABLE 1

|  | Area ratio [A1/A2] |
|---|---|
| Comparative Example 1 | 0.092 |
| Example 1 | 0.032 |
| Example 2 | 0.028 |
| Example 3 | 0.026 |

As shown in Table 1, in the composite anode active materials prepared in Examples 1 to 3, the nano-crystalline phase formed of Fe was removed by reaction with sulfuric acid, and thus a peak area of the composite anode active materials prepared in Examples 1 to 3 decreases compared to that of the composite anode active material prepared in Comparative Example 1. Accordingly, an area ratio (A1/A2) of the composite anode active materials prepared in Examples 1 to 3 was reduced due to the decreased peak area.

Evaluation Example 2: Mean Particle Diameter Measurement

Figure 3:
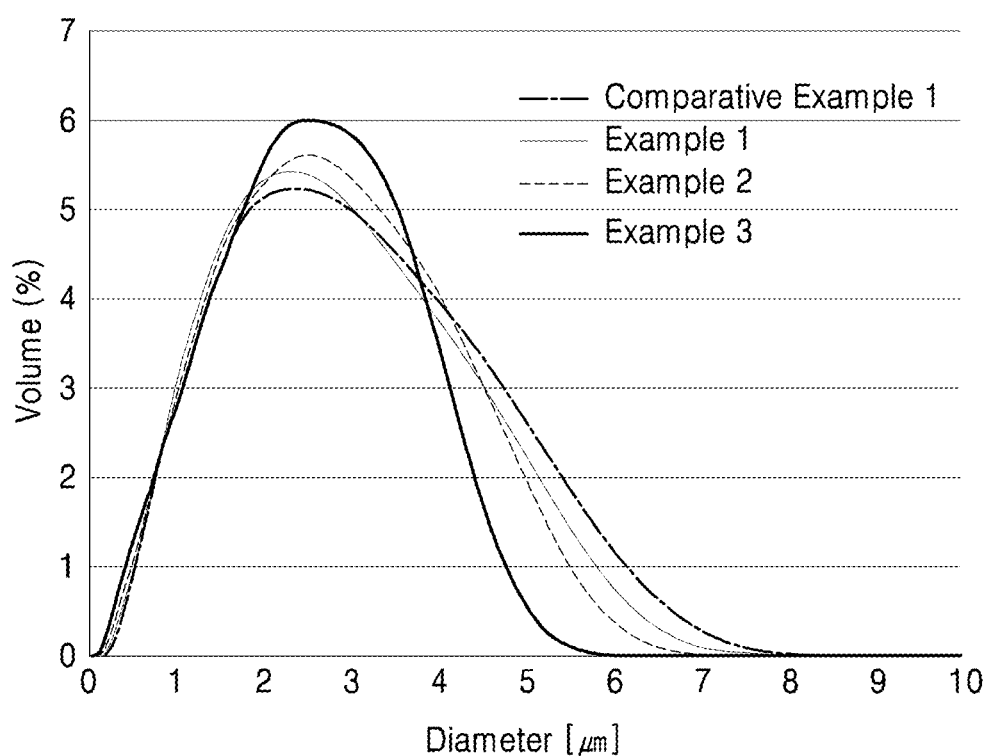
FIG. 3 is a graph showing the results of particle size analysis performed on the composite anode active materials prepared in Examples 1 to 3 and Comparative Example 1.

Mean particle diameters of the composite anode active materials prepared in Examples 1 to 3 and Comparative Example 1 were measured, and the results are shown in FIG. 3 and Table 2. LSI3 320 Laser Diffraction Particle Size Analyzer (Beckmann Coulter Inc. CA, USA) was used to measure the mean particle diameter.

TABLE 2

|  | Mean particle diameter [μm] | D10 [μm] | D50 [μm] | D90 [μm] |
|---|---|---|---|---|
| Comparative Example 1 | 1.93 | 0.750 | 2.07 | 4.52 |
| Example 1 | 1.84 | 0.707 | 2.00 | 4.27 |
| Example 2 | 1.83 | 0.692 | 2.03 | 4.16 |
| Example 3 | 1.67 | 0.580 | 1.950 | 3.74 |

As shown in FIG. 3 and Table 2, mean particle diameters (μm) of the composite anode active material prepared in Examples 1 to 3 decreased compared to that of the composite anode active material prepared in Comparative Example 1.

The decrease in the mean diameters of the composite anode active materials prepared in Examples 1 to 3 may be due to break down of the composite anode active materials into smaller particles by cracks during an etching process.

Evaluation Example 3: Evaluation of Charge-Discharge Characteristics

The coin cells of Examples 4 to 6 and Comparative Examples 2 were each charged with a constant current of 0.2 C rate at about 25° C. until the voltage of the cell reached about 0.01 V (vs. Li), and then charged at a constant voltage of about 0.01 V until the current reached 0.01 C. Afterward, the cell was discharged at a constant current of 0.2 C until the voltage reached 1.5 V (vs. Li).

Subsequently, the cell was charged with a constant current of 0.5 C rate until the voltage of the cell reached about 0.01 V (vs. Li), and then charged at a constant voltage of about 0.01 V until the current reached 0.01 C. Afterward, the cell was discharged with a constant current of 0.5 C until the voltage reached 1.5 V (vs. Li) ("Formation process").

Subsequently, each of the lithium batteries after the formation process was charged with a constant current of 1.0 C rate at about 25° C. until the voltage of the cell reached about 0.01 V, and then charged at a constant voltage of about 0.01 V until the current reached 0.01 C, followed by discharging with a constant current of about 1.0 C until the voltage reached about 1.5 V (vs. Li). This cycle of charging and discharging was repeated 100 times.

Figure 4:
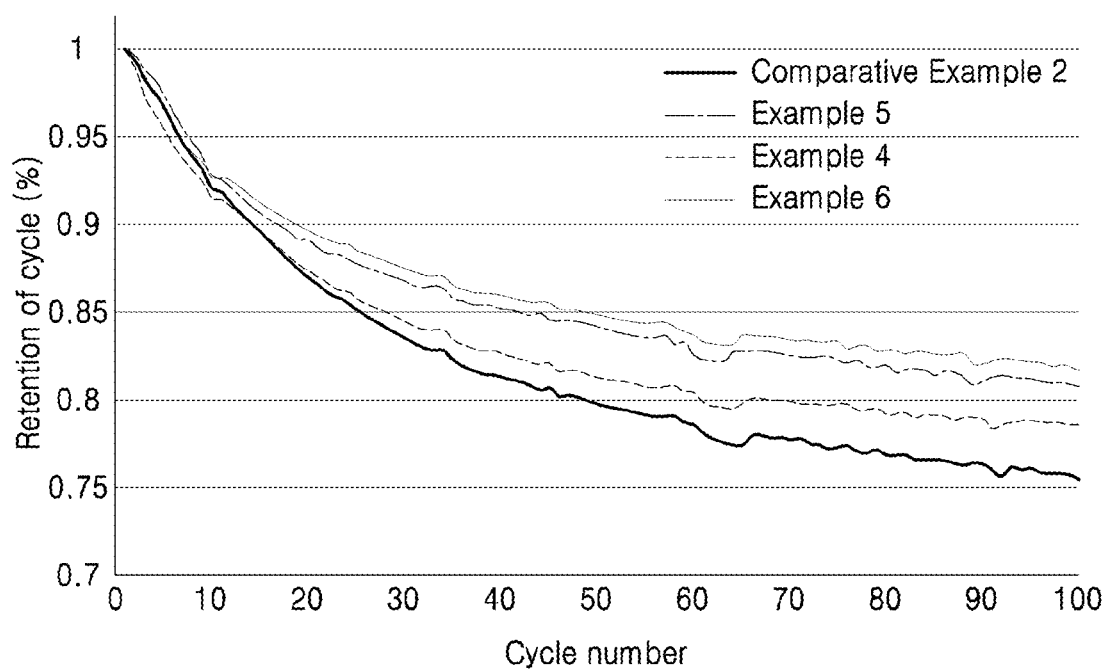
FIG. 4 is a graph showing life characteristics of lithium batteries prepared in Examples 4 to 6 and Comparative Example 2.

The results of the charging/discharging test are shown in Table 3 and FIG. 4. A capacity retention rate was represented by Equation 1:

Capacity retention rate [%]=[Discharge capacity at 100th cycle/Discharge capacity at 1st cycle]× 100

TABLE 3

| | Capacity retention rate at 100th cycle [%] |
|---|---|
| Example 4 | 78.55 |
| Example 5 | 80.39 |
| Example 6 | 81.65 |
| Comparative Example 2 | 77.27 |

As shown in FIG. 4 and Table 3, lithium batteries of Examples 4 to 6 had improved lifespan characteristics compared to that of the composite anode active material of Comparative Example 2.

As described above, according to an aspect of the one or more of the above exemplary embodiments, a lithium battery including a composite anode active material with pores having a multi-phase microstructure may have improved discharge capacity and lifespan characteristics.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

In the present disclosure, the terms "Example," "Comparative Example," "Reference Example" "Manufacture Example," "Comparative Manufacture Example," "Reference Manufacture Example" and "Evaluation Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material comprising:
   a composition represented by Formula 1; and
   a multi-phase microstructure containing an amorphous phase comprising Si and a nano-crystalline phase comprising a metal silicide;
   wherein the multi-phase microstructure further comprises a nano-crystalline phase formed of a metal M; and
   wherein the composite anode active material is porous wherein pores are distributed non-uniformly within the multi-phase microstructure:

$$Si_xM_yC_z \qquad \text{<Formula 1>}$$

wherein, in Formula 1,
   x, y, and z each represent an atomic percentage;
   x+y+z=100;
   x>y+z;
   x>0, y>0, and z≥0; and
   M is at least one metal selected from Mn, Mo, Nb, W, Ta, Fe, Cu, Ni, Co, Zr, Y, and a combination thereof.

2. The composite anode active material of claim 1, wherein M is at least one metal selected from Co, Ni, Fe, Ti, Mo, W, or a combination thereof.

3. The composite anode active material of claim 1, wherein x≥60.

4. The composite anode active material of claim 1, wherein z>0.

5. The composite anode active material of claim 1, wherein M comprises Fe.

6. The composite anode active material of claim 1, wherein the metal silicide is $FeSi_2$.

7. The composite anode active material of claim 5, wherein x≥60.

8. The composite anode active material of claim 5, wherein z>0.

9. The composite anode active material of claim 1, wherein 60≤x≤90, 5≤y≤35, and 5≤z≤20.

10. The composite anode active material of claim 1, wherein the composite anode active material exhibits a first peak at a Bragg angle 2θ of 45.0±1.0° and a second peak at a Bragg angle 2θ of 49.0±3.0° in an X-ray diffraction (XRD) spectrum of with respect to a CuK-α characteristic X-ray wavelength at 1.541 Å, wherein a ratio (A1/A2) of an area (A1) of the first peak to an area (A2) of the second peak is 0.05 or less.

11. The composite anode active material of claim 10, wherein the first peak corresponds to Fe, and the second peak corresponds to $FeSi_2$.

12. The composite anode active material of claim 1, wherein a diameter of pores of the porous composite anode active material is 500 nm or less.

13. The composite anode active material of claim 1, wherein pores of the porous composite anode active material are formed by etching at least a portion of the nano-crystalline phase formed of a metal.

14. The composite anode active material of claim 1 further comprising a coating layer that is formed on the composite anode active material.

15. The composite anode active material of claim 14, wherein the coating layer comprises carbon.

16. An anode comprising the composite anode active material of claim 1.

17. A lithium battery comprising the anode of claim 16.

* * * * *